June 17, 1952 — W. R. KELLETT ET AL — 2,600,882
CATAMENIAL BANDAGE AND ABSORPTION CONTROL ELEMENT THEREFOR
Filed April 4, 1946 — 5 Sheets-Sheet 1
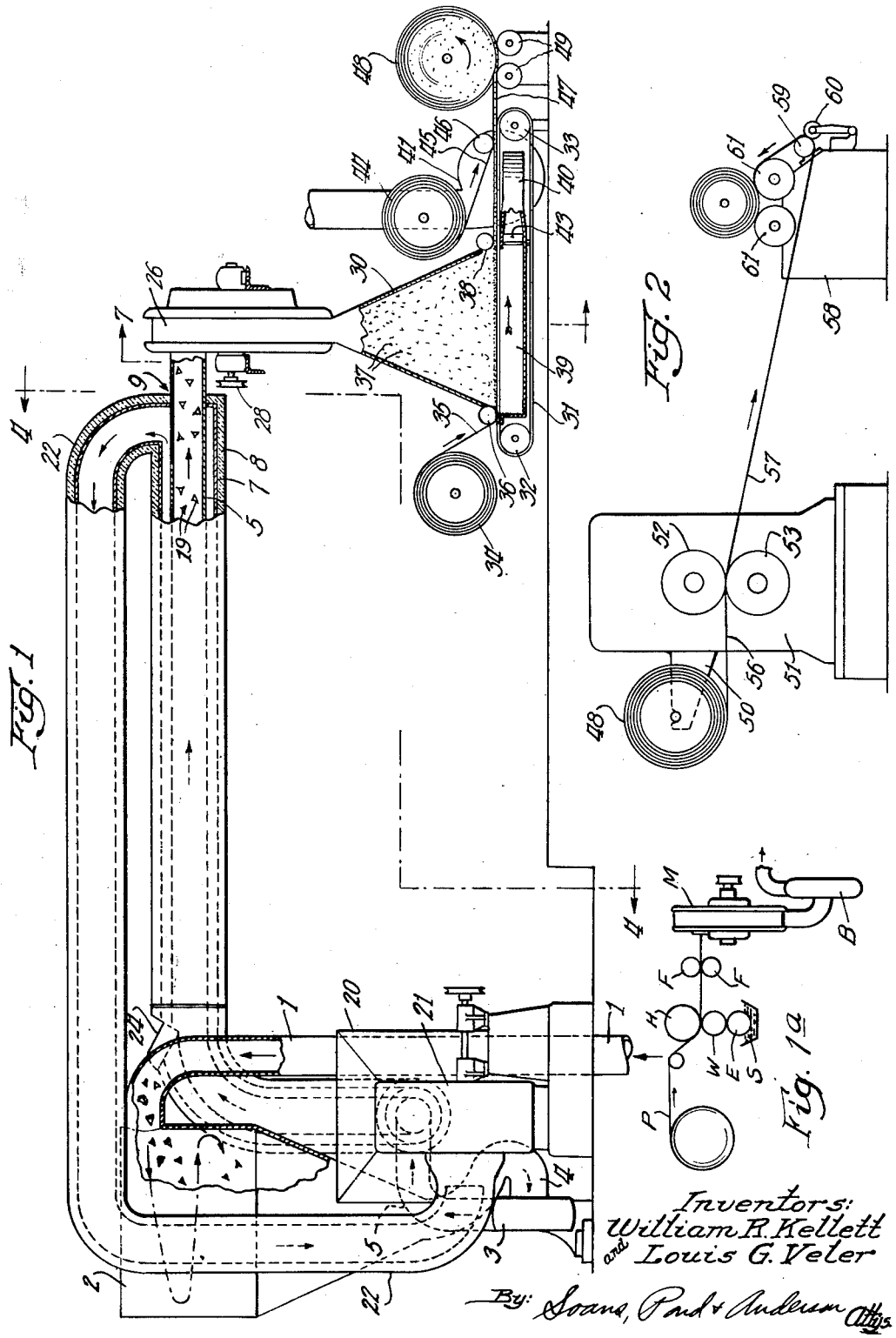
Inventors:
William R. Kellett
and Louis G. Veler
By: Soans, Pond & Anderson, Attys.

June 17, 1952     W. R. KELLETT ET AL     2,600,882
CATAMENIAL BANDAGE AND ABSORPTION CONTROL ELEMENT THEREFOR
Filed April 4, 1946     5 Sheets-Sheet 2
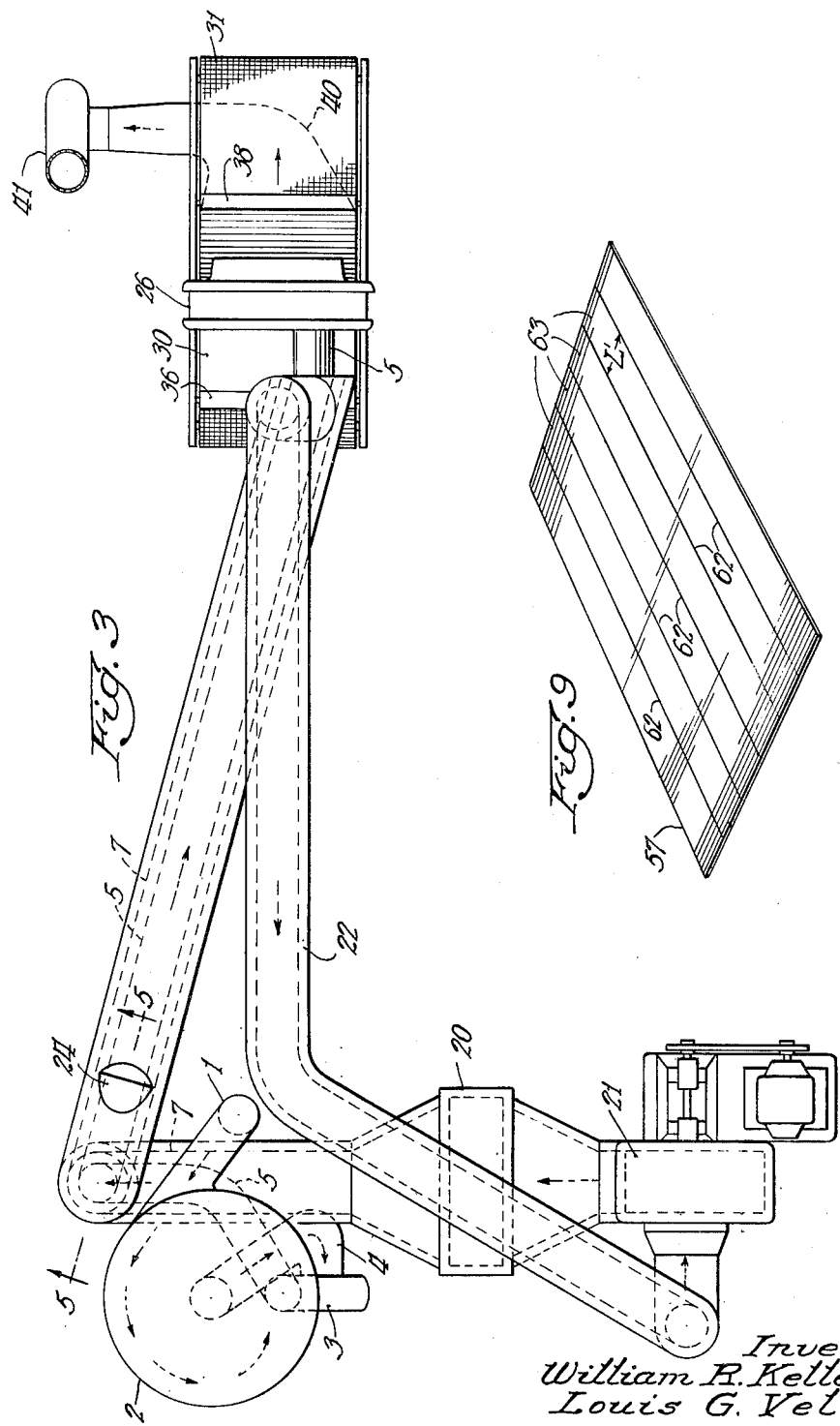
Inventors:
William R. Kellett and
Louis G. Veler
By: Soans, Pond & Anderson Attys.

June 17, 1952  W. R. KELLETT ET AL  2,600,882
CATAMENIAL BANDAGE AND ABSORPTION CONTROL ELEMENT THEREFOR
Filed April 4, 1946  5 Sheets-Sheet 3
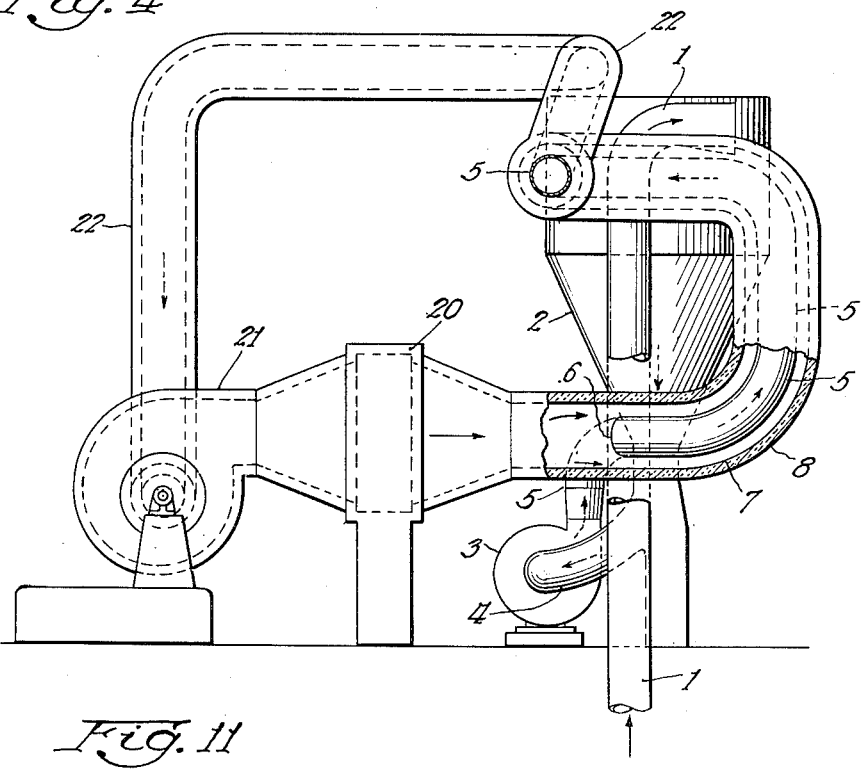
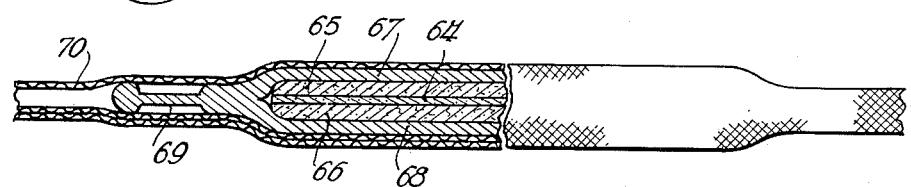
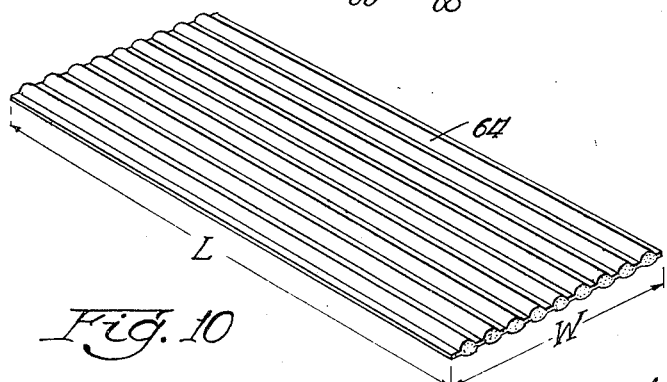
Inventors:
William R. Kellett and
Louis G. Veler
By: Soans, Pond & Anderson
Attys.

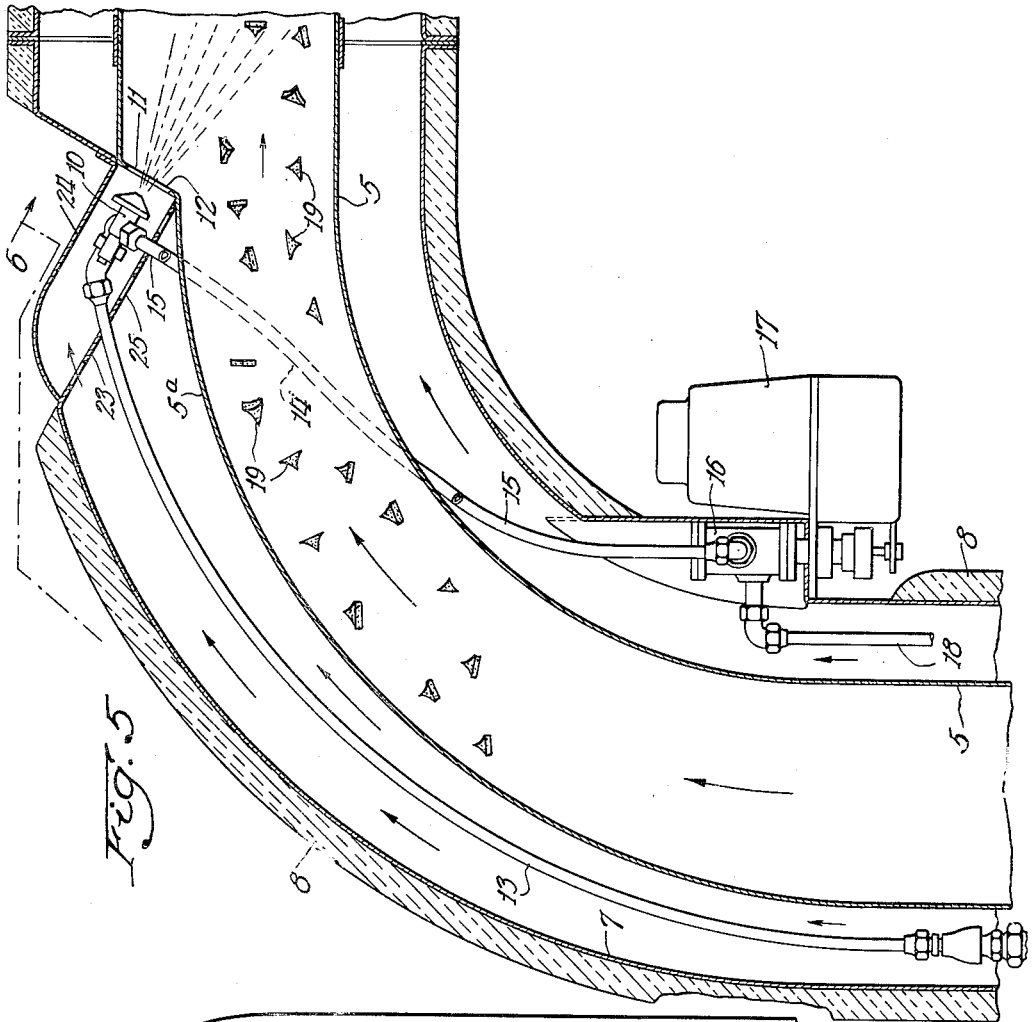
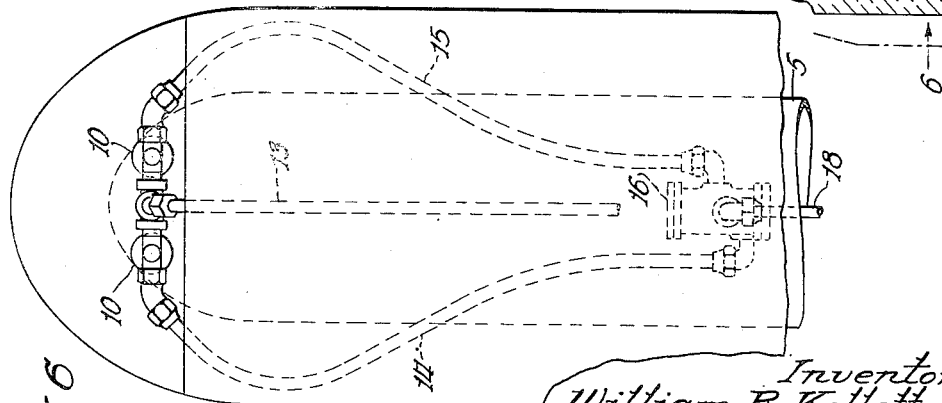

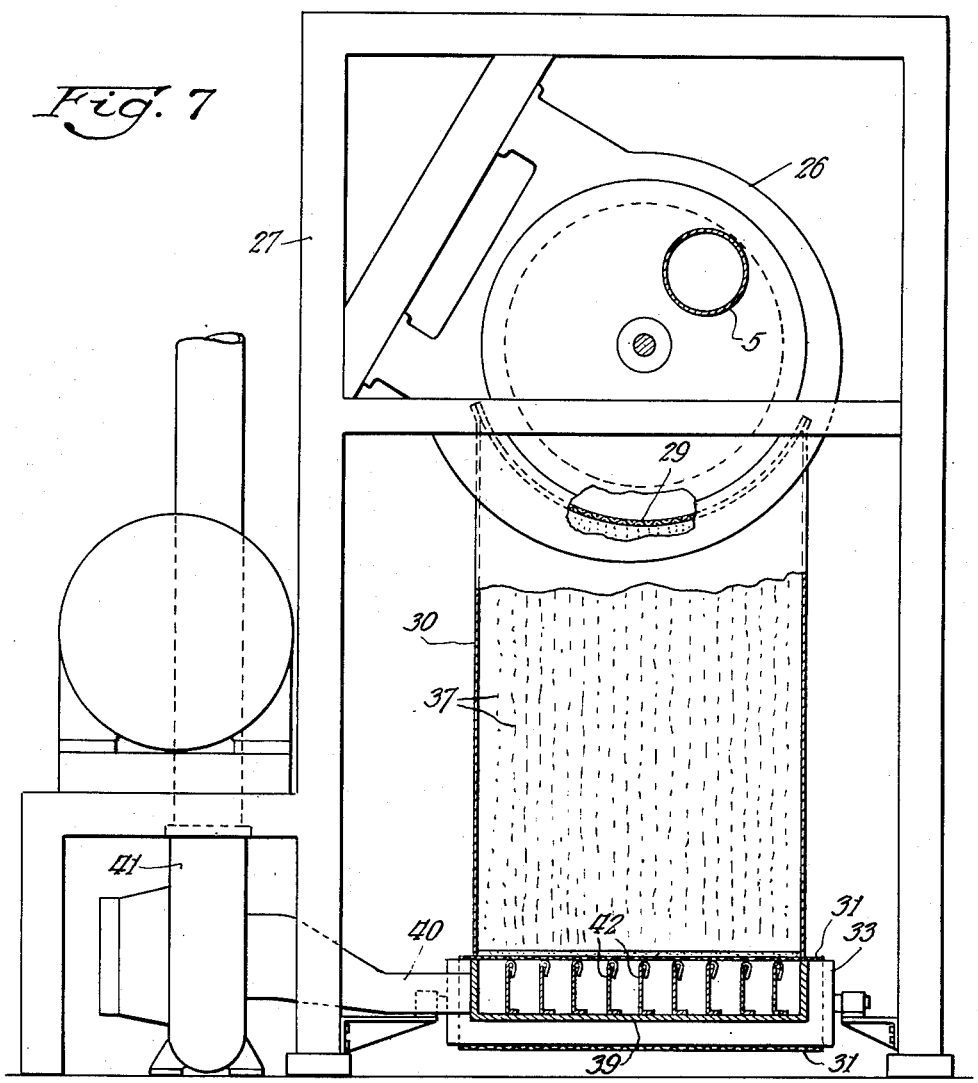
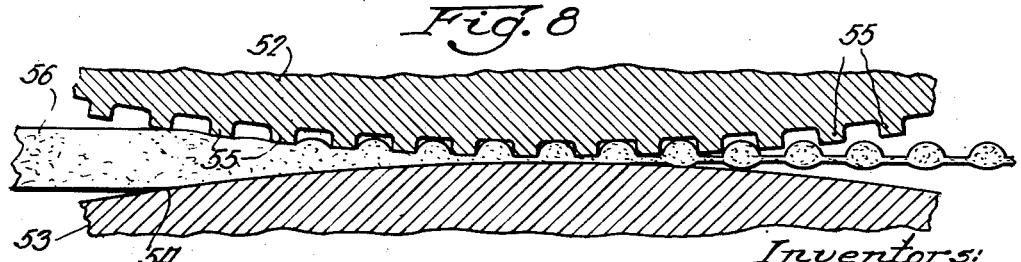

Patented June 17, 1952

2,600,882

UNITED STATES PATENT OFFICE 2,600,882

CATAMENIAL BANDAGE AND ABSORPTION CONTROL ELEMENT THEREFOR

William R. Kellett, Menasha, and Louis G. Veler, Neenah, Wis., assignors to International Cellucotton Products Company, a corporation of Delaware Application April 4, 1946, Serial No. 659,542

3 Claims. (Cl. 128—290)

This invention relates to sanitary bandage or napkin construction, to an absorption control element for such a bandage or napkin, and to a method and apparatus for producing such an element. By "absorption control element" we mean a device which, in a sanitary napkin or absorbent pad or bandage, will cause distribution or spreading within the body of the article, of fluid which penetrates to the interior of the article in a restricted or localized area more or less corresponding to a restricted or localized surface area of the article to which fluid is delivered. The purpose of effecting such spreading is to cause more of the absorbing capacity of the article to be utilized than has heretofore normally been experienced.

The present invention has for its main objects the production of an improved sanitary napkin, and the production of an exceptionally effective absorption control element of the character indicated. Other objects are to provide a method for producing the improved element with a minimum of labor, at a low cost, and in such a manner that the product will be hygienically clean, and to provide apparatus which will advantageously produce elements of the character indicated according to the method preferred.

Other objects and advantages of the invention will be understood by reference to the following specification and accompanying drawings (five sheets) wherein a selected form of the invention is illustrated.

In the drawings,

Fig. 1 is a side elevation illustrating a selected mechanism for producing the material of the improved absorption control element;

Fig. 1a is a diagrammatic illustration of a modification of part of the mechanism shown in Fig. 1;

Fig. 2 is a diagrammatic side elevation of mechanism for further acting on the material produced by the mechanism of Fig. 1;

Fig. 3 is a plan of the apparatus shown in Fig. 1;

Fig. 4 is a section on the line 4—4 of Fig. 1;
Fig. 5 is a section on the line 5—5 of Fig. 3;
Fig. 6 is a section on the line 6—6 of Fig. 5;
Fig. 7 is a section on the line 7—7 of Fig. 1;

Fig. 8 is a more or less schematic section of a detail of the mechanism shown in Fig. 2;

Fig. 9 is a perspective illustrating the product in the form in which it is wound into roll form by the mechanism shown in Fig. 2;

Fig. 10 is a perspective of a single absorption spreading element embodying the invention, and Fig. 11 is partially a side elevation, and partially a cross section through the improved sanitary napkin.

In the manufacture of sanitary napkins, an absorbent pad unit is cut from a continuous web of the pad material. The ends of the pads are usually rounded off, such rounding resulting in the production of some waste pad material. These waste pieces may be utilized in the production of new paper but for that purpose they have a relatively minor value.

According to the present invention, such waste pieces of pad material, whether embodying a plurality of relatively superposed plies of crepe tissue paper or a body of loosely felted absorbent fiber-like material usually called fluff, or both, may be converted into material and embodied in webs or sheets from which the improved absorption control elements and sanitary napkins may be cut. Such waste pieces of material may be discharged by the napkin making machines into ducts which deliver the pieces to a suitable cyclone or other collector. From such collector the pieces are conveyed to a conduit 1 (Fig. 1) into the upper end of a cyclone collector 2. The pieces are ultimately delivered by the cyclone or withdrawn from the lower end of the cyclone by a centrifugal blower 3, the inlet of which is connected to the discharge end of the cyclone 2 by a conduit 4. The discharge side of the blower 3 has connected to it a conduit 5 which as shown at 6 (Fig. 4), passes through the wall of a conduit 7 which is covered with heat insulation 8. The conduit 5 continues within the conduit 8 and emerges from the latter as indicated at 9 (Fig. 1).

By this arrangement it will be seen that the waste material from the napkin producing machinery will be collected and propelled in an airborne stream through the conduit 5 which, for the greater portion of its length, is located within the insulated conduit or casing 7. The arrangement is such that an airborne stream of fibrous material pieces which is substantially constant in its velocity and in its fibrous material content will be carried through said conduit 5.

The fibrous material pieces passing through the conduit 5 within the casing 7 are sized with suitable moisture resistant sizing, such as wax of any suitable composition. One suitable composition of wax consists of about 25 per cent of microcrystalline, 140° F. melt wax and 75 per cent refined 140° F. melt paraffin. This mixture produces a sizing material which is reasonably stable when applied to the fibrous material which is to be sized.

The wax mixture is sprayed into the air borne stream of fibrous material pieces by means of either one of a pair of suitable spray heads 10, 10 (Figs. 5 and 6) which delivers its spray of molten or liquid wax through an opening 11 in an angular wall portion 12 formed in the conduit 5. There is one opening 11 for each of the sprayers. The spray heads 10, 10 are supplied with compressed air through a suitable compressed air hose or pipe 13 located outside of the conduit 5 but inside of the casing 7. Wax is supplied to the respective spray heads by means of hoses or pipes 14 and 15 through a suitable valve 16 which is controlled by a solenoid 17.

Wax is delivered to the valve 16 by a supply pipe 18 which is connected with suitable pumping mechanism for delivering the wax under a predetermined pressure. It is preferable that the wax be pumped to the spray nozzles by means of a positive displacement gear pump (not shown) although any pump which will produce the desired steady flow of wax may be employed. Compressed air at from about 30 to 60 pounds per square inch pressure produces a satisfactory spray in the arrangement shown.

The conduit 5 is reduced somewhat in cross section as it approaches the spray nozzle opening 11, the upper wall portion 5a of the conduit in the bend immediately before the spray opening being arranged in an eccentric relationship to the lower wall portion as represented in Fig. 5. This arrangement facilitates the provision of the angular wall 12 for the spray openings 11 without producing any inwardly projecting obstruction in the conduit 5.

Pieces of fibrous material are indicated at 19 in Fig. 5, these pieces representing an air borne stream of such fibrous material pieces which emanate from the production of sanitary napkin pads as already explained. As the pieces 19 pass through the spray or fine shower of molten wax, they become more or less completely coated with the wax and to some extent, impregnated with the same.

In order to prevent cooling and setting of wax on the conduit 5, it is heated by means of hot air delivered to the casing 7 from a heater 20 (Fig. 4) through which air is blown by a suitable blower 21. The heater 20 may be an electric, steam or any other suitable type of heater which has the required heating capacity. The hot air is recirculated, the end of the casing 7 from which the conduit emerges as shown at 9 in Fig. 1, being connected to a heat insulated return pipe 22 which is connected to the inlet end of the said blower 21. The blowers 3 and 21 may be driven by any suitable means not herein shown.

By thus heating the conduit 5 any heat liquefied sizing material will be kept in a liquefied condition so that the fibrous material pieces passing through the conduit will serve to wipe such liquid from the inside surface of the pipe as an incident to the passage of said stream of pieces through the pipe.

The spray nozzle 10 may be housed in a chamber formed by a wall 23 and a removable cover 24 (Fig. 5). The wall 23 may form a part of the casing 7 and said wall is preferably provided with an opening, such as indicated at 25, to permit a limited amount of hot air to enter the housing of the nozzle 10 so as to maintain it at a temperature at which its spraying operation may be efficiently carried on.

The wax delivery pipes 14, 15 and 18 and the compressed air pipe 13 are preferably located within the hot air jacket as shown to thereby aid in maintaining the sizing material at the desired spraying temperature. Means, not shown, are provided for automatically opening one spray nozzle in the event that one being used becomes plugged. These nozzles are preferably alternately used.

At its outlet end, the conduit 5 is connected to a hammer mill 26 so as to deliver the size-coated pieces of fibrous material to said mill for disintegration.

The hammer mill 26 is a standard piece of equipment consisting of swinging arms pivoted on a central rotor which is driven at a considerable rate of speed. The pivoted arms travel at such a high peripheral speed that they effectively knock apart whatever material they engage to thereby disintegrate the same. Since the paper material which enters the hammer mill is of a fibrous nature, the disintegration of the pieces results in the reduction of the pieces to a more or less shredded or fiber-like form although not necessarily into individual fibers. The disintegrated material is fine enough that it may be deposited in a uniformly thick loosely felted layer. The processing of the material in the hammer mill serves to effect distribution of the coating of sizing material to substantially all of the fibers while also disintegrating the pieces or sheets.

Instead of spraying the stream of waste material in the conduit 5 with the sizing material, the sizing material may be sprayed into the hammer mill. This arrangement would make unnecessary the heat jacketing of the conduit, but in such a modified arrangement the hammer mill, itself, should preferably be heated to a temperature well above the melting point of wax and to that end, the mill may be jacketed for heating and heat reduction purposes.

In another arrangement, pieces or sheets of fibrous material may be run between one or more pairs of coating rolls which may be arranged to apply the desired sizing material on the surfaces of the pieces or sheets which may then be fed directly to the hammer mill to be thereby disintegrated, or to means for first shredding the coated material and then to the hammer mill. A typical arrangement of this kind is illustrated in Fig. 1a wherein a web of paper pulp P is continuously advanced by variable speed feed rolls F, first between a heated roll H and a wax applying roll W and then into a hammer mill M, shredder or the like. Wax is supplied in measured quantity to the roll W by a knurled or etched roll E which rotates in a bath of molten wax S. The fiber material discharged from the mill M is preferably delivered by the blower B to an attrition mill, hammer mill or the like for further breaking down the waxed board material and to additionally distribute the wax in the material. Such additional mill may be represented by the mill 26 in Fig. 1, from which the material is delivered to bat forming apparatus. By heating the pulp board, the wax is caused to penetrate the board to a greater extent than if applied to the board at room temperature. Thorough distribution of the wax is thereby facilitated.

Another arrangement is to prepare sheets of beater sized pulp and to feed such sized pulp sheets directly or from shredding equipment or the like, to the hammer mill for reduction to "fluff" forming fiber form. In some instances, it may be desirable to pass the material from the first hammer mill to a second hammer mill to reduce the material to the desired degree of fineness.

Sizing material other than wax may be used, if desired. For example, gum rosin or synthetic resins may be used and applied by whatever method is best suited to their particular characteristics.

In the present arrangement, the hammer mill is suitably supported on a frame structure 27 and driven from a source of power not shown, through the agency of a pulley or the like, represented at 28 (see Figs. 1 and 7). The mill has a discharge opening or outlet covered by a screen 29 (Fig. 7). The screen may be of such size that only fibers of a predetermined fineness will pass through it for delivery to the loosely felted layer forming means. A screen of about ⅛ inch mesh gives a suitable type or fineness of disintegrated material or fluff. Incident to the disintegration of the pieces of fibrous material, the hammer mill effects distribution of the sizing wax which is initially in the outer layers of the pieces, the result being that the sizing material is uniformly present throughout the entire mass of the discharged fluff.

The sized fluff passes through the discharge screen 29 and is guided downwardly in a conduit 30 which is of approximately rectangular form in cross section but which expands downwardly as shown in Fig. 1.

A screen or other pervious conveyor 31 is supported on a pair of rolls 32 and 33 which are suitably mounted for rotation, one or both of said rolls being driven by means not shown. The speed at which the conveyor is driven may be variable so that it may be caused to travel at a speed which will permit the fluff layer of desired thickness to be accumulated on the screen (or on a tissue paper web delivered to the screen) incident to the travel thereof under the lower end of the conduit 30. A roll 34 of unsized crepe tissue paper 35 is suitably supported so that the web 35 may be delivered to the conveyor 31, a guide roll 36 being provided in juxtaposition to said conveyor screen to position the paper web on the face of said conveyor.

As shown in Fig. 1, the upper reach of the conveyor travels to the right as indicated by the arrow, fluff represented at 37 descending and being deposited on the tissue paper web. A layer of such fluff will be accumulated on the tissue paper web, the depth of the layer being of course dependent upon the speed at which the tissue paper web traverses the discharge end of the conduit 30 and the volume of fluff in the descending stream in the conduit 30. At the outlet side of the discharge end of the conduit 30 there is provided a roll 38 which serves to more or less smooth the top of the fluff layer and to slightly compress it. The rolls 36 and 38 may be driven by any suitable means (not shown) to avoid the creation of any resistance to the movement thereunder of the tissue web and fluff layer respectively.

To aid the deposition of the fluff on the tissue web in its passage under the end of the conduit 30, a suction box 39 is located under the upper reach of the belt 31 and connected by a suitable conduit 40 (see Figs. 1 and 3) to a suction pump 41 which serves to create more or less of a vacuum in said suction box to thereby pull the fluff material into more or less intimate engagement with the tissue web 35 and the particles of fluff material into more or less intimate engagement with each other.

To control the suction effect at various transverse sections of the conveyor, the suction box is advantageously divided into a plurality of longitudinally extending partitions such as indicated at 42 (Fig. 7), the outlet ends of which may be controlled by dampers such as represented at 43 (Fig. 1). The dampers 43 may be individually controlled for each channel or they may be interconnected so as to maintain a relatively fixed relationship to each other and so as to produce the same proportioning of vacuum in the channels in all positions of the dampers.

Another roll 44 of unsized crepe tissue paper 45 is suitably supported near the outlet side of the conduit 30 and the web 45 of that roll is guided into superposed relation to the fluff layer by means of a suitably mounted guide roll 46. The guide roll 46 may be driven, if desired, to avoid any resistance to the passage of the tissue 45 or to aid in the feed of the tissue 45 into place on the fluff layer. The fluff layer is represented at 47 in Fig. 1.

The sandwich thus formed comprising top and bottom tissue paper webs and an intervening layer of loosely felted pulp is then preferably rolled up into a roll 48 by suitable winding mechanism, such as represented at 49. The winding mechanism 49 may be of any known form and is more or less diagrammatically represented by the rolls 49.

The roll 48 may be removed from the winding mechanism 49 and delivered to supporting means, such as represented at 50 of an embossing machine 51 which next acts on the composite bat of material to interconnect the tissue webs and fluff layer to form a unitary structure frame. The embossing machine 51 embodies upper and lower rolls 52 and 53 respectively of which the lower roll 53 may have a smooth surface 54 as shown in Fig. 8, and the upper roll a longitudinally grooved or fluted surface providing upstanding ribs 55. The bat of material represented at 56 is guided between these rolls with the result that the bat is highly compressed particularly in the areas engaged by the surfaces of the ribs 55. The roll 53 alone may be positively driven, the roll 52 being freely rotatable and driven as an incident to friction resulting from the passage of the bat 56 between the rolls. The roll 52 may be urged against the roll 53 under a pressure on the order of about 1100 pounds per inch of nip; that is to say, 1100 pounds per inch of roll length, such pressure being sufficient to consolidate the fibers of the top and bottom tissues and the intervening layer of fluff to such an extent that the parts become effectively united.

The ribs 55 of the embossing roll 52 are preferably in the form of herringbone ribs; that is to say, the opposite halves of the ribs are arranged at complementary angles so that there will at all times be contact between a rib of the roll 52 and the roll 53 thereby avoiding any bumping effect which might occur if the ribs were disposed in parallel relation to the action of the roll.

The embossed bat 57 which emerges from between the rolls 52 and 53 is next guided to mechanism for slitting the bat into strips of desired width and for winding the strips into rolls. Such slitting and winding mechanism is represented diagrammatically at 58 (Fig. 2), the embossed web being guided around a roll 59 against which one or more slitters, such as represented at 60, act to slit the bat into strips of the required width. From the guide roll 59 the strips are guided properly to winding mechanism which is here represented as comprising a pair of driven rolls 61. The winding mechanism may, of course, be of any suitable character and is merely diagrammatically represented by the roll 61.

The slitted embossed web is more or less diagrammatically represented in Fig. 9 wherein the width of the web is represented as being slit into six strips by suitably spaced slits 62. Each of the strips 63 thus formed will, of course, be rolled into its own roll by the winder 61.

In the production of sanitary napkins, a rolled strip 63 will be suitably mounted so that the strip may be fed from the roll into sandwich position between other parts of the sanitary napkin pad and from the resulting composite structure portions of the required pad width will be cut in accordance with known practice.

The absorption control element produced and embodied in a sanitary napkin by the said means, is represented alone in Fig. 10 wherein the length L of the element corresponds to the width L' of the strip 63 and the width W of the element corresponds to the width of the sanitary napkin pad produced.

The control element 64 thus produced comprises top and bottom crepe tissue paper members and an intervening layer of sized fluff. The sizing in the fluff is quite uniformly distributed so that the fluff is effective to resist penetration by moisture for a considerable length of time and until the absorbent material on one side of the element as in a sanitary napkin is well loaded. The control element produced in accordance with this invention thus acts somewhat in the nature of a baffle. However, the creping in the tissue paper covers of the element, and the highly compressed longitudinally extending zones in the unsized cover plies of the element provide a degree of accelerated capillary action which also tends to spread the area of absorption. The described element is highly effective in a sanitary napkin to prevent so-called strike through, i. e. the passage of absorbed fluids directly from one side of the napkin to the other, and is thus a highly advantageous construction.

In the production of the element it would, of course, be possible to direct the composite pad directly from between the roll 46 and the conveyor screen 31 (Fig. 1) to the embossing mechanism, but for practical purposes it is preferred to wind up the composite bat and to transfer rolls thereof to the embossing machine. As a practical matter, the speed at which the composite bat is formed by the apparatus shown in Fig. 1 is considerably less than the speed at which the embossing mechanism may advantageously be run. Hence, the embossing machine need be operated only intermittently to emboss the composite bat produced by a single unit of mechanism, such as shown in Fig. 1.

A sanitary bandage embodying the improved absorption control element is illustrated in Fig. 11. It comprises the absorption control element 64 disposed intermediate layers or plies 65 or 66 of absorbent fluff material. These layers of fluff material thus juxtaposed with the control element, comprise a multiplicity of absorbent cellulose fibers arranged in haphazard relationship to produce a very soft absorbent mass which, because of the haphazard arrangement of the fibers, has no predominant grain or other characteristic which would direct the spread of fluid absorption predominantly in any one direction.

The fluff material in the layers 65 and 66 is quite similar to the fluff material which enters into the construction of the absorption control element but it is, of course, not sized. Outside of the fluff layers 65 and 66, there are layers 67 and 68 respectively of absorbent crepe tissue paper, these layers each comprising a plurality of plies of crepe tissue paper preferably arranged with the line of creping extending lengthwise of the napkin, this being also true of the direction of creping in the crepe tissue paper cover plies of the absorption control element 64.

The crepe tissue layers 67 and 68 extend endwise beyond the opposite ends of the fluff layers 65 and 66 and have their opposite ends united by means of pressure as indicated at 69 in accordance with the teaching of Reissue Patent No. 21,076 to Glomstead, May 9, 1939.

The usual gauze jacket is applied to the absorbent pad, such gauze jacket being represented at 70, the same having a single ply over the top surface of the pad, and two plies over at least a portion of the bottom surface incident to the overlapping of marginal portions of the gauze jacket which is formed of a sheet of gauze wrapped transversely around the pad. The gauze jacket extends beyond the ends of the absorbent pad body to form the usual attachment tabs.

In a sanitary bandage, fluid deposited in some localized area on one face of the pad quite readily penetrates the gauze jacket and the tissue and fluff layers of the pad on the side thereof on which the fluid is deposited. The crepe tissue layer, such as 67, has a desirable tendency to spread the area of fluid absorption lengthwise of the pad from the localized area of fluid deposition, but that tendency is not strong enough to prevent a part of the fluid from penetrating towards the interior of the pad and towards the opposite side thereof especially in a limited or localized area in which fluid may initially be deposited on the bandage. However, when the fluid strikes the sized core of the control element 64 its further passage toward the opposite side of the pad is resisted and this resistance is strong enough to cause the fluid to spread laterally within the pad. Lateral spreading of fluid within the pad is promoted in the direction of the length of the pad by the direction of creping in the affected cover of the control element and by the elongated compressed zones of the cover sheet, the latter spreading action being in the nature of the action provided by the so-called equalizer unit shown in Heitmeyer Patent 1,863,333. The sized material in the core of the control element thus contributes materially toward the equalizing effect of the compressed zones and this so-called equalizing effect may, within certain practical limits, be amplified by adding additional unsized tissue plies to the surface of the control element.

Because of the haphazard arrangement of the fibers in the pad or layer 64, the wax or otherwise waterproofed external surfaces of the fibers produce a more or less labyrinthic mass or maze of waterproof-walled tortuous passageways through said layer and many of said passageways will be more or less restricted or interrupted by fiber pieces which intersect such passageways. Because of the waterproof wall surfaces of these tortuous passageways and the restricted or interrupted and tortuous form thereof, said passageways are not capillary in nature but instead have the capacity to resist the flow of fluid into and through the same. However, when the pad is worn in the usual manner, leg and body movements tend to repeatedly compress and release the napkin so that an undulating pressure pumping effect is produced which induces such entrance and flow of fluid. This effect is somewhat similar to the effect of immersing a rubber sponge in water and squeezing and releasing the sponge to induce thorough wetting of the sponge. The waterproofing of the fibers helps to preserve the normal resiliency of the fibers so that said control element does not break down or mat together when wetted but instead tends to maintain its distended resilient body form and this in turn tends to resist roping or stringing of the napkin when in use, and also to preserve the fluid holding or storing ability and capacity of the element.

The sized core of the control element 64 does not produce an impervious baffle but instead constitutes a permeable core through which the absorbed fluid may ultimately penetrate. Such penetration will occur after the absorbent layers, such as 67 and 65 on one side of the control element, have become fairly well loaded with absorbed fluid and pressure exerted on the control element as already explained. The absorbent layers, such as 66 and 68 on the opposite side of the pad, may then take up additional fluid delivered to the pad in said localized area but absorption will then usually occur over a major portion, if not all of the area of contact between the control element and the absorbent layer 66. This follows from the fact that a corresponding area of the initially wetted side of the pad is well loaded with fluid and tends to effect penetration of the control element over a correspondingly well spread area as distinguished from the localized area of fluid application.

In some instances, penetration of the control baffle may be completed in a concentrated or localized area due perhaps to extreme wetness of the initially wetted side of the pad in such an area. In such a case, the control element cover sheet on the lower or then dry side of the pad will promote spreading of the penetrating fluid from such localized area in about the same manner as above explained in respect of the action of the other cover sheet. Hence, the last wetted cover sheet serves as a safety measure to insure fluid delivery to a major portion of the area of the lowermost or outermost layer of fluff absorbent material. Furthermore, if the bandage is kept in use for such an extended period that the absorbed fluid actually reaches the remaining tissue layer, said remaining tissue layer will also tend to insure distribution of the fluid throughout the area of the pad.

Various changes may be made in the described structures and arrangements without departing from the spirit of the invention as set forth in the appended claims in which some of the specified elements and steps of procedure may be replaced by equivalent elements and steps without departing from the invention.

We claim:

1. A catamenial napkin pad comprising a layer of fiber-like pieces of material which are externally waterproof and haphazardly arranged so as to form a labyrinthic mass of interstices which constitute waterproof-walled tortuous passageways through said layer, said passageways having the capacity to normally resist the entrance of fluid into said passageways and to permit such entrance when a substantial quantity of fluid is applied against the pad and the layer is subjected to undulating pressure such as normally occurs in the pad due to body movements under normal conditions of use of the napkin.

2. In a catamenial napkin, a pad comprising the combination of a layer of fluid absorbing material and a juxtaposed layer of fiber-like pieces of material which are externally waterproof and haphazardly arranged so as to form a labyrinthic mass of interstices which constitute waterproof-walled tortuous passageways through said layer and which passageways have the capacity to normally resist the entrance of fluid into said passageways and the flow of fluid through said last mentioned layer, said passageways also having the capacity to permit such fluid entrance and flow when the same is induced by sufficient fluid pressure such as occurs when said first mentioned layer contains a substantial quantity of fluid which is carried thereby into contact with said layer of fiber-like pieces and the pad is subjected to undulating pressure such as normally occurs in the pad due to body movements under normal conditions of use of the napkin, said layer of fiber-like pieces of material also having the capacity to retain fluid in said passageways thereof to thereby supplement the absorption capacity of said layer of fluid absorbing material.

3. In a catamenial napkin, a pad comprising the combination of a pair of layers of fluid absorbing material and an intervening layer of fiber-like pieces of material which are externally waterproof and haphazardly arranged so as to form a labyrinthic maze of interstices which constitute waterproof-walled tortuous passageways through said intervening layer and which passageways have the capacity to normally resist the entrance of fluid into said passageways and the flow of fluid through said intervening layer, said passageways also having the capacity to permit such fluid entrance and flow when the same is induced by sufficient fluid pressure such as occurs when one of said layers of absorbing material contains a substantial quantity of fluid which is carried thereby into contact with said intervening layer and the pad is subjected to undulating pressure such as normally occurs in the pad due to body movements under normal conditions of use of the napkin, said intervening layer also having the capacity to retain fluid in said passageways thereof to thereby supplement the absorption capacity of said pair of layers of fluid absorbing material.

WILLIAM R. KELLETT.
LOUIS G. VELER.

REFERENCES CITED

The following references are of record in the file of this patent:

UNITED STATES PATENTS

| Number | Name | Date |
|---|---|---|
| 1,773,956 | Crane | Aug. 26, 1930 |
| 2,189,840 | Simison et al. | Feb. 13, 1940 |
| 2,296,341 | Fourness | Sept. 22, 1942 |
| 2,336,745 | Manning | Dec. 14, 1943 |

FOREIGN PATENTS

| Number | Country | Date |
|---|---|---|
| 432,825 | Great Britain | Aug. 2, 1935 |
| 535,916 | Great Britain | Apr. 25, 1941 |